Nov. 11, 1969  F. J. HENKEL  3,477,379
COMPOSITE FLUID PRESSURE PUMP OR MOTOR CASING BODY AND
METHOD OF MAKING THE SAME
Filed Jan. 16, 1968
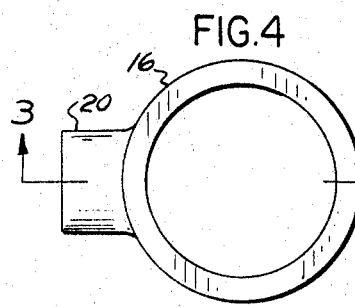
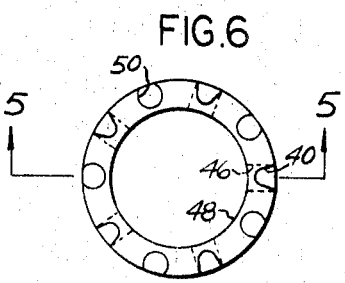
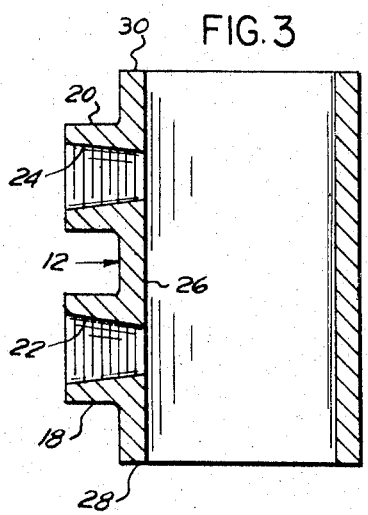
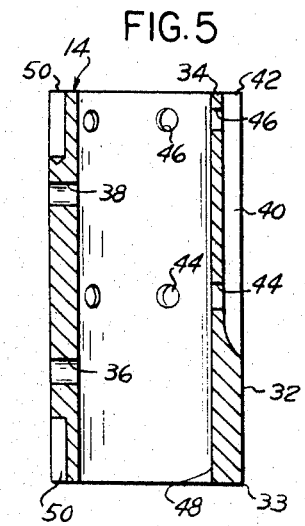
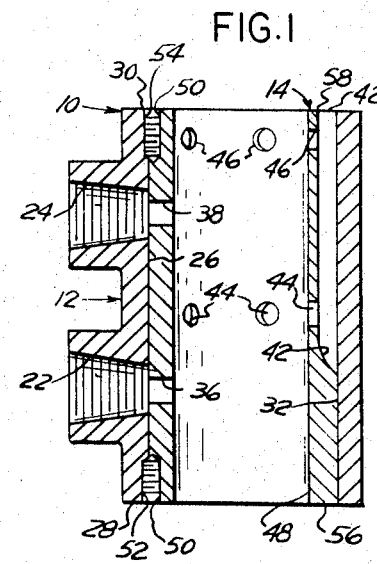
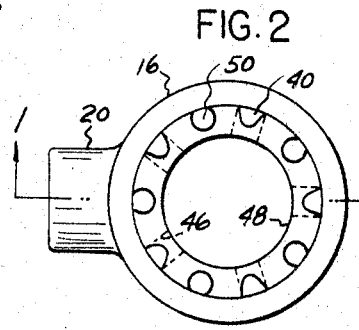
INVENTOR
FERDINAND J. HENKEL
BY Barthel & Bugbee
ATTORNEYS

United States Patent Office 3,477,379
Patented Nov. 11, 1969

3,477,379
COMPOSITE FLUID PRESSURE PUMP OR MOTOR CASING BODY AND METHOD OF MAKING THE SAME
Ferdinand J. Henkel, Birmingham, Mich., assignor to Lamina, Inc., Oak Park, Mich., a corporation of Michigan
Filed Jan. 16, 1968, Ser. No. 698,209
Int. Cl. F04b 21/08
U.S. Cl. 103—216                    6 Claims

ABSTRACT OF THE DISCLOSURE

This composite fluid pressure pump or motor casing body and method provides tubular outer and inner casing body components which are separately produced and machined with complex fluid passageways both longitudinal and transverse, and are then assembled and secured to one another in telescoping relationship after their respective passageways have been properly aligned. This enables the production of such a casing body with complex passageways which could not be produced in the conventional single piece construction by known conventional machining methods or apparatus, especially where the construction requires greatly elongated longitudinal passageways with transverse portions.

---

In the drawings,

FIGURE 1 is a central longitudinal section through a composite pressure fluid pump or motor casing body, according to one form of the invention, taken along the line 1—1 in FIGURE 2;

FIGURE 2 is a top plan view of the composite casing body shown in FIGURE 1;

FIGURE 3 is a central longitudinal section through the outer component of the casing body of FIGURE 1, taken along the line 3—3 in FIGURE 4;

FIGURE 4 is a top plan view of the outer component of FIGURE 3;

FIGURE 5 is a central longitudinal section through the inner component of the casing body of FIGURE 1, taken along the line 5—5 in FIGURE 6; and FIGURE 6 is a top plan view of the inner casing body component shown in FIGURE 5.

Referring to the drawing in detail, FIGURES 1 and 2 show a composite fluid pressure pump or motor casing body, generally designated 10, according to one form of the invention as consisting generally of a tubular outer casing body component 12, and a tubular inner casing body component 14 disposed in snugly-fitting telescoping relationship with one another so as to form a liquid-tight assembly. The composite casing body 10 is particularly well adapted for use in the rotary piston hydraulic motor disclosed in FIGURES 9 to 15 inclusive and claimed in Henkel Patent No. 3,261,235 issued July 19, 1966, for Portable Rotary Machining Appliance and Apparatus. It will be seen from this patent that the present composite casing body 10 is provided at its opposite ends with closure heads (not shown) one of which is bored for the passage of a power shaft connected to a rotary valve member whereas the other head contains an internally lobed stator chamber which in turn contains a lobed rotary piston having one less lobe than the stator, and drivingly connected to the power shaft by a double-headed splined connection so that the rotor simultaneously rotates and moves in an orbital path within the stator while supplied with pressure fluid and exhausted of fluid by the thus-synchronized rotary valve member. These additional elements of the device set forth in the above-mentioned drawing figures and specification of the said Henkel are beyond the scope of the present invention. The latter, however, enables the rapid and inexpensive production of elongated casing bodies with complex passageways for such pumps or motors which would at least be very difficult and very expensive, if not impossible, to produce by conventional machine tools and machining methods. Even to produce short casing bodies with such passageways requires the use of long drills at difficult angles.

In particular, the outer casing body component 12 is of approximately cylindrical shape and is provided on one side with spaced bosses 18 and 20 containing threaded fluid ports 22 and 24 adapted to be connected to correspondingly-threaded fluid pipes. Ordinarily, the port 22 is used as the pressure fluid inlet or supply port whereas the port 24 is the fluid outlet or discharge port. The body component 12 is provided with a longitudinal slightly tapered outer bore 26 having a bottom opening 28 of slightly larger diameter than the top opening 30. A taper of approximately four-thousandths of an inch (0.004 inch) is found satisfactory to provide the desired locking effect. The inner component 14 (FIGURES 5 and 6) is of approximately hollow cylindrical shape but slightly tapered to the same degree as the tapered bore 26 of the body 16 of the outer component 12. That is, the external surface 32 of the inner component 14 has the same outside diameter at its lower end 33 as the inside diameter of the bottom opening 28 of the bore 26, whereas the upper end 34 has the same slightly smaller outside diameter as the top opening 30 of the upper end of the bore 26 of the outer component 12.

The inner component 14 is provided with radial ports 36 and 38 coaxial or concentric with the tapered ports 22 and 24 in the outer component 12 when the two components 12 and 14 have been assembled as described below and shown in FIGURE 1. The inner component 14 is likewise provided with multiple circumferentially spaced longitudinally extending external grooves or intermediate fluid passageways 40 which are conveniently machined by a milling cutter in a milling machine. The upper ends of the grooves 40 are open, in order to transmit fluid in timed relationship to and from the rotary piston portion of the motor or pump (not shown) located above the upper end 34. The inner body component 14 is additionally provided with longitudinally spaced lower and upper radial fluid ports 44 and 46 (FIGURE 5) formed as by drilling in a drilling machine, and directed approximately radially to the longitudinal circumferential grooves 40. The lower transverse ports 44 are spaced circumferentially apart from one another as are also the upper transverse ports 46 spaced apart from each other. The inner ends of the ports 36, 38, 44 and 46 open into a central valve bore 48.

The opposite ends 32 and 34 of the inner body component 14 between the multiple longitudinal grooves 40 are provided with multiple longtiudinal threaded fastener or bolt holes 50 formed as by drilling and located between the grooves 40 in alternating sequence. The bolt holes 50, as seen from FIGURES 2 and 6, are incomplete in that they are of slightly less than full circular cross-section. The bolt holes 60 are bored before assembly but not threaded until after assembly, as described below.

In assembling the outer and inner body components 12 and 14 to form the composite casing body 10 of FIGURES 1 and 2, the smaller end 34 of the inner component 14 is pushed into the larger end of the bore 26 in the outer component located at the lower end 28 thereof and the components 12 and 14 rotated relatively to one another so that the inner component ports 36 and 38 are aligned coaxially with the outer component ports 22 and 24. The body components 12 and 14 are then pressed snugly together and the bolt holes 50 again drilled to make them of completely circular cross-section by extending into the outer body component 12 adjacent its opposite ends 28 and 30, whereupon the bolt holes 50 are now threaded to receive corrrespondingly threaded bolts (not shown) which at the same time secure the heads (not shown) to the opposite ends 56 and 58 respectively of the composite casing body 10. These bolt holes and bolts, by extending into both components 12 and 14, prevent relative rotation therebetween.

I claim:
1. A composite casing body for a fluid pressure pump or motor, comprising
   a hollow outer casing body component having an outer longitudinal bore therein and having a pressure fluid supply port and a fluid discharge port disposed in spaced relationship to one another and communicating with said outer bore,
   a hollow inner casing body component having an external surface disposed in telescoping mating engagement with said outer longitudinal bore of said outer body component and having an inner longitudinal bore therein and fluid supply and discharge ports communicating with said supply and discharge ports of said outer body component,
      said inner casing body component having longitudinally extending recesses in the exterior thereof and having transverse ports therein spaced longitudinally away from said supply and discharge ports and extending from said recesses into said inner bore,
   and means for securing said outer and inner components to one another.

2. A composite casing body, according to claim 1, wherein said outer bore of said outer body component and said external surface of said inner body component are of mating tapered configuration substantially throughout their entire lengths.

3. A composite casing body, according to claim 1, wherein said securing means comprises longitudinally disposed fastener holes extending part way into both of said body components and fasteners seated in said holes whereby to prevent relative rotation therebetween.

4. A composite casing body for a fluid pressure pump or motor, comprising
   a hollow outer casing body component having an outer longitudinal bore therein and having a pressure fluid supply port and a fluid discharge port disposed in spaced relationship to one another and communicating with said outer bore,
   a hollow inner casing body component having an external surface disposed in telescoping mating engagement with said outer longitudinal bore of said outer body component and having an inner longitudinal bore therein and fluid supply and discharge ports of said outer body component,
      said inner casing body component having longitudinally extending recesses in the exterior thereof and having transverse ports therein extending from said recesses into said inner bore,
   and means for securing said outer and inner components to one another,
      said transverse ports of said inner casing body component being disposed in two sets thereof spaced longitudinally apart from one another and each such set including a plurality of said transverse ports spaced circumferentially apart from each other.

5. A composite casing body, according to claim 4, wherein the lengths of said body components exceed their diameters and wherein said recesses comprise elongated grooves disposed in circumferentially spaced relationship with one another with each groove connecting a transverse port in one set thereof to a transverse port in the other set thereof.

6. A composite casing body, according to claim 4, wherein said fluid supply and discharge ports of said inner body component are spaced longitudinally apart from said sets of transverse ports thereof.

References Cited
UNITED STATES PATENTS

| | | | |
|---|---|---|---|
| 2,701,743 | 2/1955 | Mattingly et al. | 103—216 XR |
| 2,869,945 | 1/1959 | Mattingly | 103—216 |

ROBERT M. WALKER, Primary Examiner